US012720587B2

(12) United States Patent
John et al.

(10) Patent No.: US 12,720,587 B2
(45) Date of Patent: Aug. 25, 2026

(54) SYSTEMS AND METHODS FOR NETWORK RESOURCE PREEMPTION

(71) Applicant: Verizon Patent and Licensing Inc., Basking Ridge, NJ (US)

(72) Inventors: Toby Varughese John, Murphy, TX (US); Frank Jager, Lakeway, TX (US); Bibi M. Hakimzadeh, Fort Worth, TX (US); Weimin Shi, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 317 days.

(21) Appl. No.: 18/523,190

(22) Filed: Nov. 29, 2023

(65) Prior Publication Data

US 2025/0176011 A1 May 29, 2025

(51) Int. Cl.

| | |
|---|---|
| ***H04W 72/563*** | (2023.01) |
| ***H04L 43/028*** | (2022.01) |
| ***H04W 72/543*** | (2023.01) |
| ***H04W 76/10*** | (2018.01) |

(52) U.S. Cl.
CPC ......... *H04W 72/563* (2023.01); *H04L 43/028* (2013.01); *H04W 72/543* (2023.01); *H04W 76/10* (2018.02)

(58) Field of Classification Search
CPC .. H04W 72/563; H04W 76/10; H04W 72/543
See application file for complete search history.

(56) References Cited

U.S. PATENT DOCUMENTS

| | | | | |
|---|---|---|---|---|
| 2020/0396637 | A1* | 12/2020 | Wang | H04W 28/0268 |
| 2021/0160890 | A1* | 5/2021 | Selvanesan | H04W 72/56 |
| 2021/0176752 | A1* | 6/2021 | Yang | H04W 72/23 |
| 2022/0400401 | A1* | 12/2022 | Gupta | H04L 47/70 |
| 2025/0141745 | A1* | 5/2025 | Mukherjee | H04L 41/122 |
| 2025/0168281 | A1* | 5/2025 | Lee | H04L 61/5007 |

* cited by examiner

*Primary Examiner* — Won Tae C Kim

(57) ABSTRACT

In some implementations, a first network device may receive, from a user equipment (UE), a request for a network resource. The first network device may determine, based on the request for the network resource, a prioritization associated with the UE, wherein the prioritization relates to a quality of service (QoS) attribute of the UE or a message priority of a message associated with the request for the network resource. The first network device may determine that a resource availability of resources at the first network device is less than an availability threshold. The first network device may transmit a preemption message to at least one of the UE or a second network device, wherein the preemption message indicates an interruption to one or more network resources associated with the UE or one or more other UEs associated with the second network device.

20 Claims, 7 Drawing Sheets

400

SYSTEMS AND METHODS FOR NETWORK RESOURCE PREEMPTION

BACKGROUND

Quality of Service (QoS) is a set of mechanisms and policies that can be established in a wireless communication system to ensure reliable and efficient delivery of communication services. A QoS parameter may specify a type of service, a configuration for providing a service, or one or more requirements or thresholds for providing the service. For example, a QoS parameter may be associated with indicating a reliability threshold or latency threshold that is to be achieved for an ultra-reliable low-latency communication (URLLC) service that is being provided in a wireless communication system. Similarly, a QoS parameter may be associated with indicating a data rate threshold for enhanced mobile broadband (eMBB) services or a delay threshold associated with enhanced machine type communication (eMTC) services.

DETAILED DESCRIPTION OF EXAMPLE EMBODIMENTS

Figure 1A:
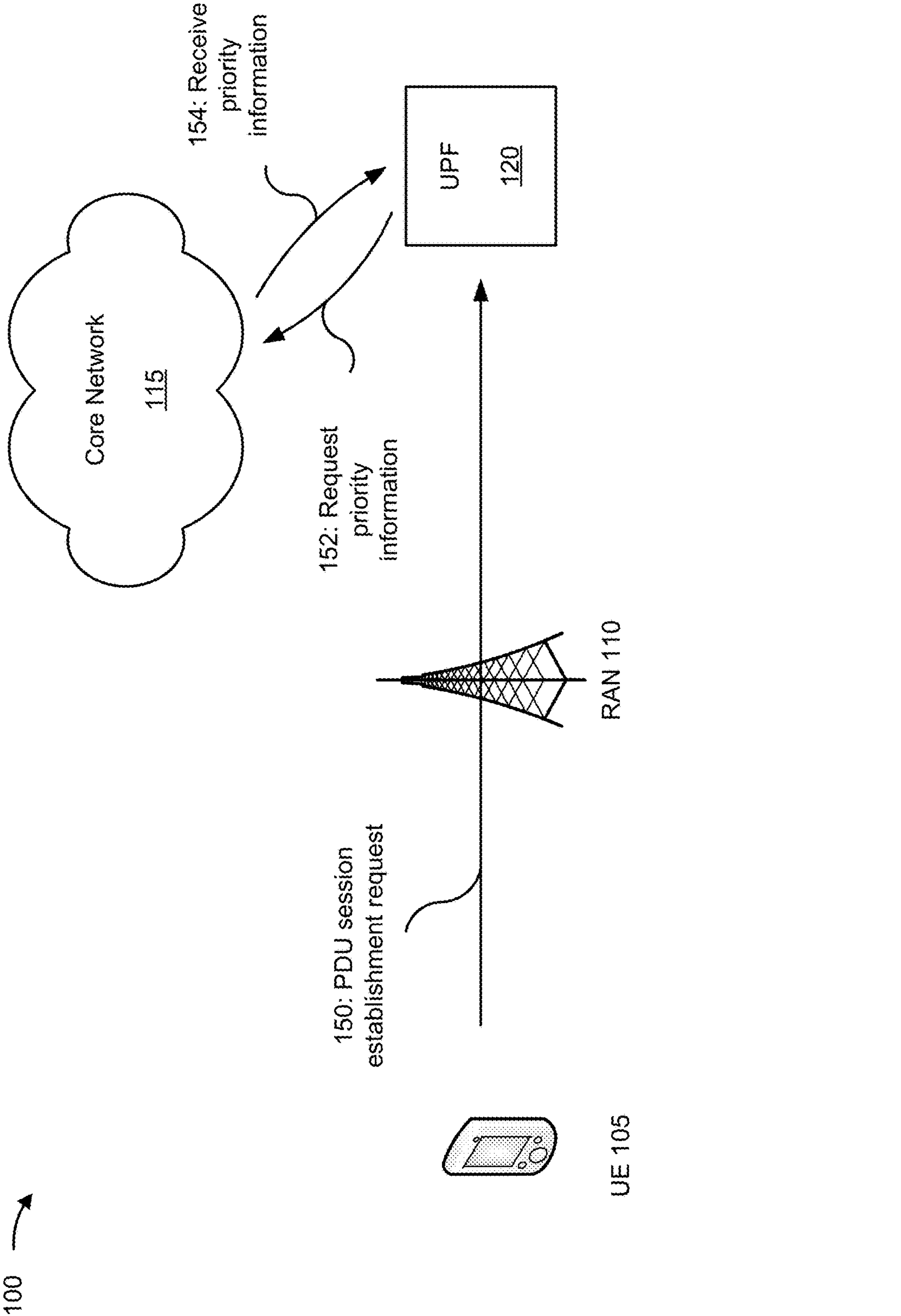
FIGS. 1A-1D are diagrams of an example associated with network resource preemption.

The following detailed description of example implementations refers to the accompanying drawings. The same reference numbers in different drawings may identify the same or similar elements.

Different user devices, services, channels, and/or flows may be assigned different priority levels within a wireless communication network. For example, an ultra-reliable low-latency communication (URLLC) may be assigned a first quality of service (QoS) with a first priority value and an evolved multimedia broadband (eMBB) service may be assigned a second QoS with a second priority value. When a radio access network (RAN) device, such as a base station, determines that an amount of resources available for allocation is insufficient to fulfill all requests for resources, the RAN device may allocate resources in accordance with a prioritization. For example, a base station may assign more resources to a higher QoS communication and fewer resources to a lower QoS communication. In this way, the base station avoids interruption of one or more characteristics of a service, such as failing to meet a reliability characteristic or a latency characteristic of a URLLC service.

In another example, the base station may avoid allocation of resources to a lower priority user. For example, the base station may determine that a first user device is associated with a first QoS attribute and a second user device is associated with a second QoS attribute, which indicates a lower level of prioritization than the first QoS attribute. In this example, the base station may transmit an error message to the second user device to indicate that insufficient resources are available to fulfill a request by the second user device. Additional details of such an error notification are described in 3GPP Technical Specification (TS) 23.501, Section 6.4.1.4.1, Release 18, Version 18.3.0. For example, when a protocol data unit (PDU) session cannot be established as a result of a resource unavailability in a user plane function (UPF), a session management function (SMF) may cause an information element (IE) of a PDU session establishment reject message to include a cause value indicating the resource availability. In this way, an SMF can resolve a resource contention issue.

However, with increasingly complex wireless communications system deployments, such as cloud network deployments, microservices deployments, and/or modularized system architectures, resource contention issues can arise at other network functions, such as at a 5G UPF, a 4G packet gateway (PGW), an access and mobility management function (AMF), or a session management function (SMF). For example, hardware (or cloud computing resource allocations) that are used to support different network devices may have limited resources, which may result in resource availability issues at different network devices when congestion levels exceed a resource availability threshold. As a particular example, a threshold level of resource utilization may result, without prioritization at an AMF, may result in a failure of a session management (SM) context creation. Similarly, an SMF may be unable to create or modify a session, which may result in a failure of a session establishment procedure. Additionally, with increasingly complex wireless communications system deployments, the usage of virtual network functions (VNFs) and cloud-native network functions (CNFs), as well as the use of tunnelization of network flows, may prevent an access point (e.g., a base station) from performing QoS-based prioritization for network traffic.

Some implementations described herein enable QoS-based resource allocation preemption at a core network device. For example, a 5G UPF may resolve a resource contention at the 5G UPF by prioritizing a higher QoS priority service or message over a lower QoS priority service or message. Similarly, a 4G PGW may resolve a resource contention at the 4G PGW by prioritizing the higher QoS priority service or message over the lower QoS priority service or message. Similarly, an AMF or SMF, among other examples, may perform deep packet inspection (DPI) to determine a QoS of a network traffic flow and may prioritize the resources for, for example, establishing, creating, or modify a context associated with the network traffic flow or a UE associated therewith. In these examples, the core network device (e.g., a UPF) may determine a priority associated with a resource request, determine that a resource availability is less than a resource availability threshold, and may transmit a preemption message to preempt one or more other allocations of resources. Based on preempting the one or more other allocations of resources, the UPF may allocate resources (e.g., at the user plane) to fulfill the request. As a result, resource contention issues can be resolved at a core network device, such as at a UPF or a PGW. By resolving a resource contention issue at the core network device, a likelihood of a failure to fulfill a service at the core network device is reduced, thereby improving network performance. In other words, although a RAN or access network may have resources available for providing a service in a network, a core network system may lack resources for service and session requests, which may result in a failure to provide the service.

FIGS. 1A-1D are diagrams of an example 100 associated with network resource preemption. As shown in FIGS.

1A-1D, example 100 includes a user equipment (UE) 105, a RAN 110, a core network 115, and a UPF 120 (which may be included in the core network 115 and which may communicate with other devices or functions of the core network 115).

As shown in FIG. 1A, and by reference number 150, the UPF 120 may receive a resource request from a UE 105. For example, the UPF 120 may receive a request for PDU session establishment from the UE 105 via the RAN 110. For example, the UE 105 may transmit a request for PDU session establishment to the RAN 110 and the core network 115, which may result in a message being propagated to the UPF 120. In this example, the PDU session establishment message may be directed to an authentication and management function (AMF), which may perform a session management function (SMF) selection procedure and transmit a context request to a selected SMF. The SMF may perform subscription retrieval or subscription update and may transmit a context response to the AMF. A PDU session may be authenticated and/or authorized by the core network 115, and the SMF may select a policy control function (PCF) and may select the UPF 120. Based on selecting the UPF 120, the SMF may transmit a session establishment or modification request message (to which the UPF 120 may transmit a session establishment or modification response). In other words, the UE 105 may transmit a resource request, as shown, which may trigger a set of procedures that includes the UPF 120 receiving a message associated with PDU session establishment.

In another example, the UPF 120 may receive a request for resources in connection with a data transmission. For example, when the UE 105 already has a PDU session established and can, for example, transmit uplink data, the UPF 120 may receive a trigger to perform a modification on the existing PDU session. In this case, the UPF 120 may monitor a resource availability of the existing PDU session to determine whether resources are available at the UPF 120 to support the existing PDU session.

In some implementations, the UPF 120 may receive a periodic request for resources in connection with a communication. For example, when the UE 105 is performing a periodic transmission associated with a configured service, the UPF 120 may periodically allocate resources for the periodic transmission. Additionally, or alternatively, the UPF 120 may periodically monitor a status of (previously) allocated (periodic) resources associated with the periodic transmission.

As further shown in FIG. 1A, and by reference numbers 152 and 154, the UPF 120 may obtain priority information. For example, the UPF 120 may request priority information from the core network 115 and receive priority information from the core network 115. Additionally, or alternatively, the UPF 120 may parse the PDU session establishment request to obtain priority information. In some implementations, the priority information may be associated with a message. For example, the UPF 120 may receive a service-based interface (SBI) message priority associated with a particular transmission associated with the UE 105 (e.g., a transmission to the UE 105 or a transmission from the UE 105). In this example, the UPF 120 may receive the message-based priority information in connection with a request for resources for transmission of the message (e.g., included in the resource request) or based on communication with the core network 115 or the UE 105 (e.g., the UPF 120 may request and receive priority information from a core network device). In some implementations, the UPF 120 may determine the message-based priority information based on a type of the message. For example, the UPF 120 may determine that a first type of message has a first priority and a second type of message has a second priority based on a configured specification.

Additionally, or alternatively, the priority information may be associated with a quality of service (QoS) attribute. For example, the UPF 120 may determine an allocation retention priority (ARP) value associated with the resource request. In this example, the UPF 120 may determine the QoS attribute based on the request (e.g., included in the request) or based on a communication with the core network 115 or the UE 105. For example, the UPF 120 may request and receive an ARP value from an SMF or a policy control function (PCF) of the core network 115. Additionally, or alternatively, the UPF 120 may determine another type of QoS attribute, such as a 5G QoS identifier (5QI) parameter, a latency parameter, a delay parameter, a reliability parameter, or a retransmission parameter, among other examples. In some implementations, the UPF 120 may perform a deep packet inspection procedure to determine a QoS attribute or parameter. For example, the UPF 120 may analyze packet data or code payload (e.g., in addition to packet header analysis) to determine one or more characteristics of a packet, such as a QoS attribute associated with the packet or data therein.

Additionally, or alternatively, the priority information may be associated with a subscriber or user. For example, the UPF 120 may determine that a first subscriber or user of UE 105 is associated with a first priority level and that a second subscriber or user of another UE is associated with a second priority level. Additionally, or alternatively, the UPF 120 may determine that a first type of UE 105 is associated with a first priority level and a second type of UE 105 is associated with a second priority level.

Figure 1B:
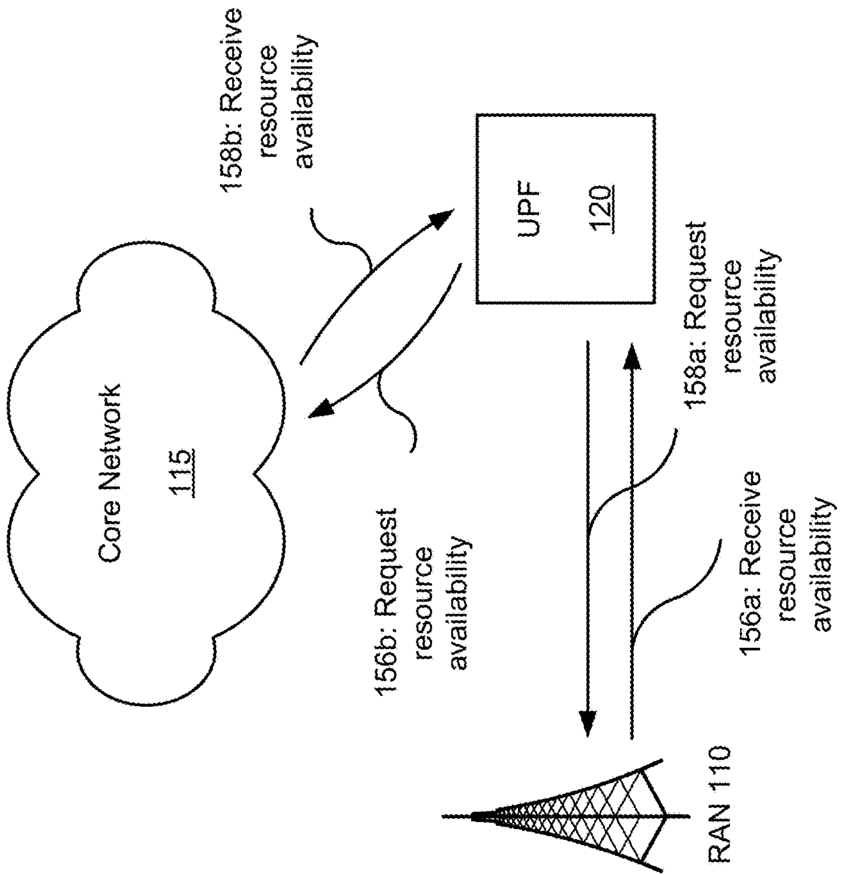
Figure 1B:
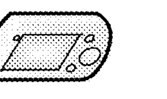
Figure 1B:

As shown in FIG. 1B, and by reference numbers 156 and 158, the UPF 120 may determine a resource availability. For example, the UPF 120 may request and receive resource information from the RAN 110, as shown by reference numbers 156*a* and 158*a*. Additionally, or alternatively, the UPF 120 may request and receive resource information from the core network 115, as shown by reference numbers 156*b* and 158*b*. In some implementations, the UPF 120 may determine the resource availability based on a network measurement. For example, the UPF 120 may receive information, associated with a measurement of a channel, indicating a level of channel congestion. Additionally, or alternatively, the UPF 120 may determine the resource availability based on a resource allocation. For example, the UPF 120 may identify an amount of network resources that have been allocated to fulfill a set of resource requests of a set of UEs in a network. Additionally, or alternatively, the UPF 120 may determine a hardware resource availability. For example, the UPF 120 may determine an availability of processing resources, memory resources, or buffer resources, among other examples for communication tasks. In other words, the UPF 120 may determine that each UE, which is connected to the UPF 120, is associated with a particular amount of memory resources and may determine that an amount of available memory resources does not satisfy a resource availability threshold. Additionally, or alternatively, the UPF 120 may determine a backend resource availability. For example, the UPF 120 may determine an amount of control plane resources that are available (e.g., for exchanging signaling messages on a wired or wireless backend).

Figure 1C:
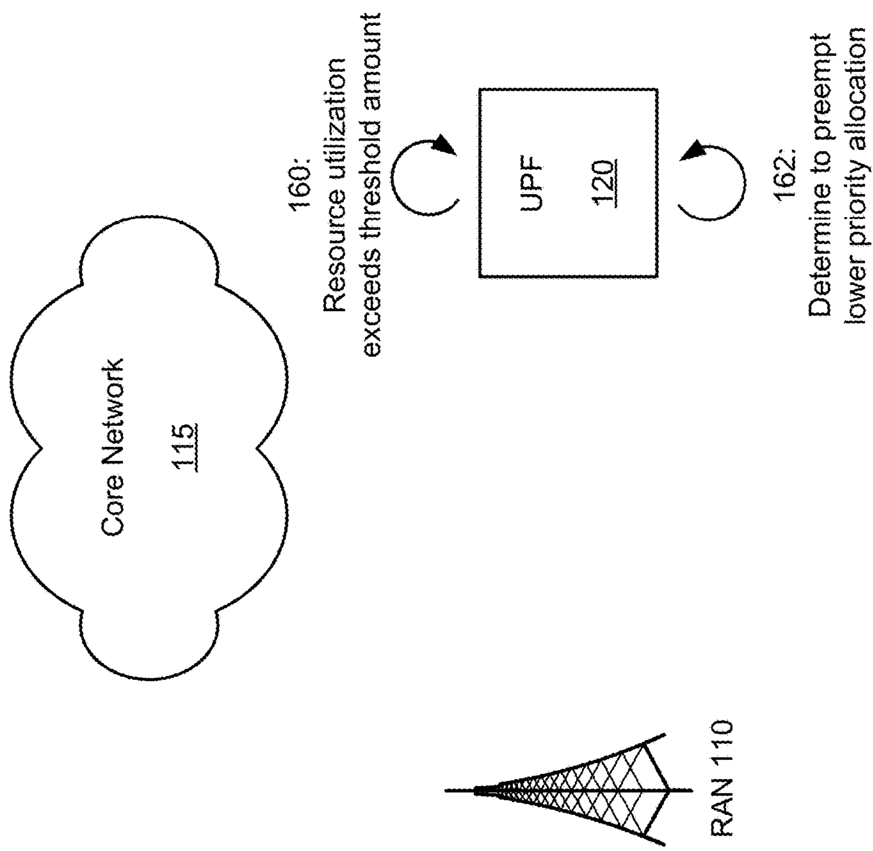
Figure 1C:
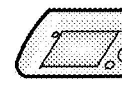

As shown in FIG. 1C, and by reference number 160, the UPF 120 may determine that a resource utilization exceeds a threshold amount. For example, the UPF 120 may determine that a resource availability associated with the RAN 110 does not satisfy a resource availability threshold. In some implementations, the UPF 120 may determine a resource availability threshold based on one or more parameters. For example, the UPF 120 may determine the resource availability threshold based on a service type, a user type, a subscription, or a priority level, among other examples. In this example, the UPF 120 may determine a first resource availability threshold (e.g., for triggering preemption) when a service of the resource request is a first type of service and a second resource availability threshold when the service of the resource request is a second type of service.

In some implementations, the UPF 120 may determine that a threshold amount of resources are not available (or that fulfilling a request may result in a threshold amount of resources not being available). For example, the UPF 120 may receive a request and may determine that fulfilling the request results in the threshold amount of resources not being available. In this case, the UPF 120 may determine to reject or preempt the request to reserve the threshold amount of resources for another request or user (e.g., a higher priority request or user). In other words, the UPF 120 may be configured to ensure that there is some availability for high priority users (e.g., users associated with a higher priority QoS, ARP, 5QI, service based interface (SBI) message priority (SMP), or general packet radio service (GPRS) tunnelling protocol (GTP) version 2 control (GTPv2-C) priority) in the UPF 120 or another core network device for, for example, an emergency use or a high priority use.

In some implementations, the UPF 120 may determine an amount of resources associated with the resource request. For example, when the UE 105 requests establishment of a connection for a particular QoS flow, the UPF 120 may determine access point resources for the particular QoS flow, hardware resources (e.g., for storing a context of the QoS flow or processing the QoS flow), control plane resources (e.g., for signaling associated with establishing, updating, or maintaining the QoS flow), or another type of resource for the QoS flow. Based on determining the resources that are (or are predicted to be) associated with the resource request, the UPF 120 may determine whether a resource availability is sufficient for fulfilling the resource request. For example, the UPF 120 may determine whether a resource availability threshold is satisfied for an amount of resources that are to be allocated for the resource request.

As further shown in FIG. 1C, and by reference number 162, the UPF 120 may determine to preempt a lower priority allocation. For example, the UPF 120 may identify an allocation of resources to another device (e.g., another UE 105 or a network device) and may determine that the allocation of resources to the other device is to be preempted to enable a resource allocation to the UE 105. In other words, in one example, the UPF 120 may determine that the UE 105 is requesting a QoS flow with a higher priority than another QoS flow of another UE, and may determine to preempt the other UE (and the lower priority QoS flow thereof) to enable a reallocation of access point (network) resources, control plane resources, or device resources to the UE 105. In this way, the UPF 120 (or another network device performing a preemption procedure described herein) may enable provision of high priority services (e.g., emergency communication services) even when resource availability is low (e.g., by enabling preemption of lower priority communication services).

In some implementations, the UPF 120 may identify relative prioritizations of different resource allocations. For example, the UPF 120 may determine that the resource request is associated with a first priority level and may identify one or more resource allocations associated with a second priority level that is less than the first priority level. In this example, the UPF 120 may select a resource allocation with the second priority level for preemption to enable reallocation of resources to the resource request with the first priority level. Additionally, or alternatively, the UPF 120 may determine a ranking or ordering of resource allocations. For example, the UPF 120 may order a set of resource allocations based on relative priority levels and select a lowest priority allocation for preemption.

Figure 1D:
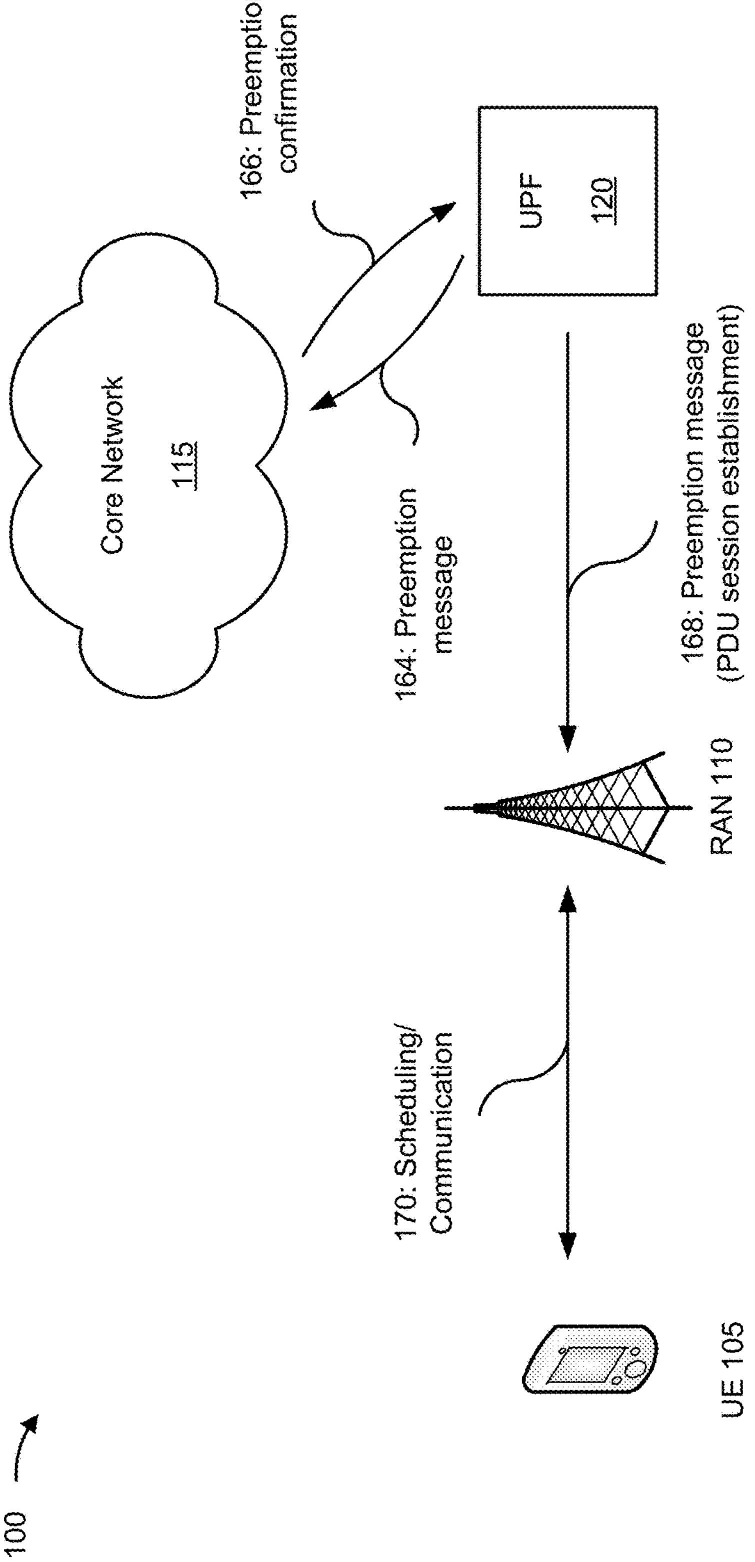

As shown in FIG. 1D, and by reference number 164 and 166, the UPF 120 may transmit a preemption message to, for example, the RAN 110 (or a core network device of the core network 115) and may receive a response to the preemption message. For example, the UPF 120 may transmit a preemption message to a device of the core network 115, such as an SMF. Additionally, or alternatively, the UPF 120 may transmit a preemption message to another device of the core network 115 or the RAN 110 to preempt a resource allocation. In some implementations, the UPF 120 may transmit the preemption message to enable a reallocation of resources. For example, the UPF 120 may transmit the preemption message to cause a set of network resources to be re-assigned from a lower priority resource allocation to a higher priority resource allocation. In this case, the UPF 120 (or another network device, such as an AMF, SMF, or PCF) may transmit the preemption message to, for example, tear down an active session to free up resources and repurpose the resources for a higher priority user or service flow.

Additionally, or alternatively, the UPF 120 may transmit the preemption message to cause a connection to be removed, torn down, or altered. For example, the UPF 120 may transmit the preemption message to another core network device of the core network 115 to cause the other core network device to remove, tear down, or alter a connection, thereby freeing up resources in the other core network device, in the UPF 120, or in some other device (e.g., yet another core network device of the core network 115). This may enable the UPF 120 to transmit a resource allocation message to reallocate network resources (e.g., resource blocks (RBs)), hardware resources (e.g., memory resources) or core resources (e.g., control plane resources), which were allocated to the connection (e.g., to store a UE context for the connection), to the UE 105. Although some implementations are described herein in terms of a UPF 120, other network devices may perform a preemption procedure to reallocate resources (e.g., network resources or device resources), such as a packet gateway (PGW) (e.g., a 4G PGW), an access and mobility management function (AMF), or another network device with, for example, a limited set of available resources. In this way, implementations described herein support modularity and deployment of network devices with smaller resource allocations (e.g., by enabling dynamic preemption and priority-based reallocation of resources), thereby enabling wider deployment of network services. Additionally, or alternatively, some implementations described herein may extend network resource preemption to preemption of other resources based on network characteristics (e.g., to ensure that, for example, memory resources or processing resources are assigned to higher priority new QoS flows rather than lower priority existing QoS flows), thereby ensuring that networks can satisfy QoS criteria.

In some implementations, the UPF 120 may transmit an indicator of the preemption of the resource allocation. For example, the UPF 120 may transmit an information element (IE) that indicates that a resource is being preempted. In this example, the IE may include an indication of a cause for the preemption (e.g., that the resource is being reallocated to a higher priority communication), which a recipient of the preemption indication may use to adjust a communication configuration or to determine whether to request a new allocation of resources.

As further shown in FIG. 1D, and by reference number 168, the UPF 120 may transmit a preemption message. For example, the UPF 120 may transmit a PDU session establishment message that includes a resource allocation associated with a preemption of another resource allocation to another device. Additionally, or alternatively, the UPF 120 may maintain a PDU session or packet data network (PDN) session using the resource allocation (e.g., which is reallocated from a lower priority communication). In this case, the UPF 120 may transmit a context message or status message indicating the resource preemption and/or an allocation of resources. By performing a preemption procedure at the UPF 120, the UPF 120 may enable call setup (or another fulfilled request) to be transparent to the UE 105 that is receiving a resource allocation. In contrast, for a UE or service flow that is being preempted to free up resources for the UE 105, the UPF 120 may transmit the preemption message to notify one or more control plane processing network functions, such as an AMF or SMF to enable removal or release of traffic flow information associated with the UE or service flow that is being preempted.

Additionally, or alternatively, a resource availability may be determined and a preemption performed for another type of access network, such as a Wi-Fi network. In this case, a preemption procedure may be performed at a non-3GPP interworking function (N3IWF) or a non-seamless WLAN offload function (NSWOF), which may obtain priority information (e.g., a 5QI or QoS parameter) from a unified data management (UDM) or unified data repository (UDR). Accordingly, the UPF 120 may transmit a preemption message to trigger preemption at, for example, the N3IWF or NSWOF or may receive a preemption message to trigger preemption within the core network 115 or the RAN 110 from, for example, the N3IWF or NSWOF.

In some implementations, the UPF 120 may transmit a preemption notification to the RAN 110. Additionally, or alternatively, the UPF 120 may transmit the preemption notification to another device, such as a device of the core network 115 (e.g., an SMF or AMF). In some implementations, as shown by reference number 170, the RAN 110 may schedule resources and/or communicate with the UE 105 in accordance with the preemption message. For example, the UE 105 may receive a resource allocation as a result of the preemption. Based on receiving an allocation of resources, the UE 105 may communicate on an uplink or a downlink using the allocation of resources.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
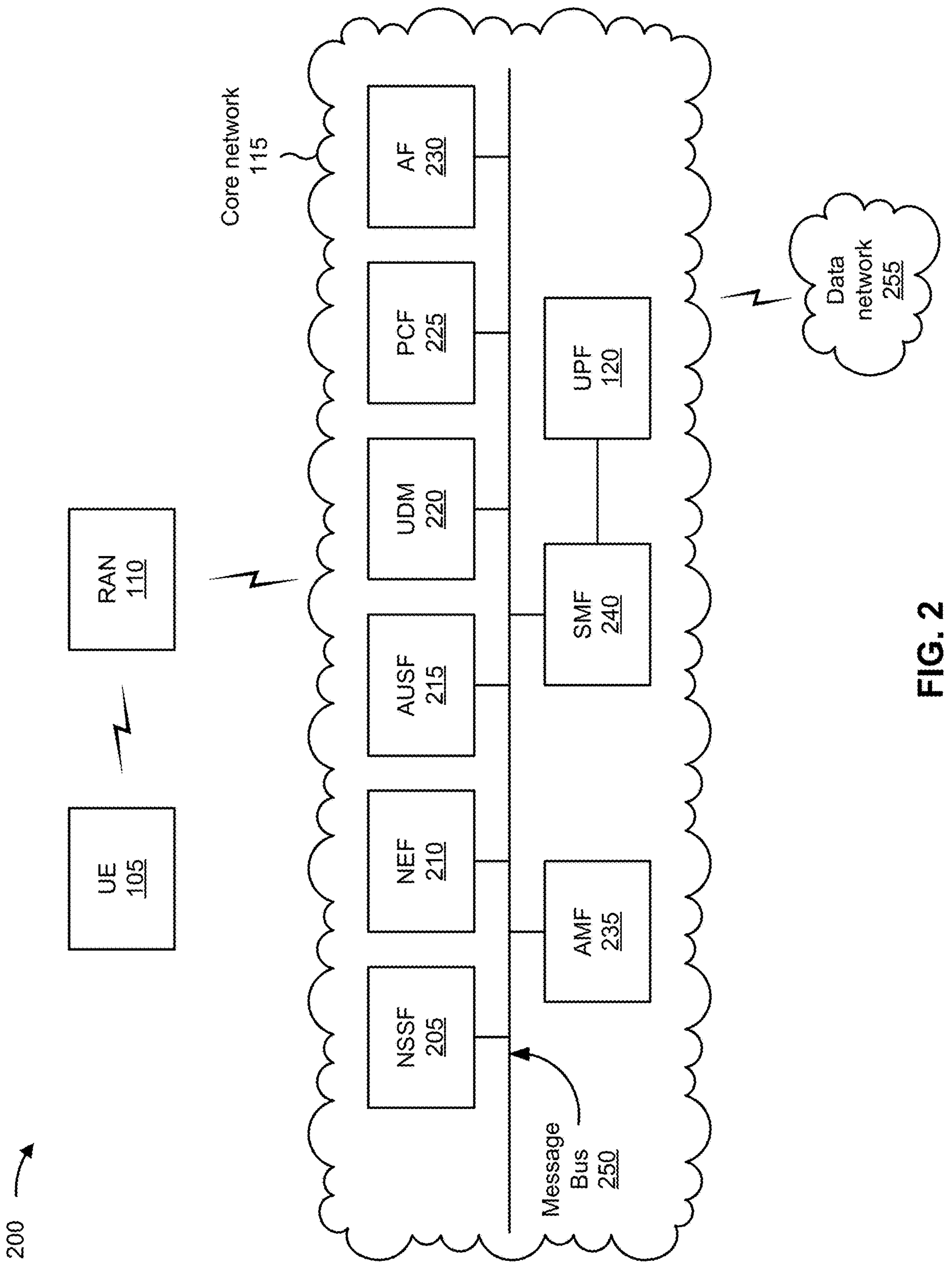
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include a UE 105, a RAN 110, a core network 115, and a data network 255. Devices and/or networks of example environment 200 may interconnect via wired connections, wireless connections, or a combination of wired and wireless connections.

UE 105 includes one or more devices capable of receiving, generating, storing, processing, and/or providing information, such as information described herein. For example, UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device. In some implementations, UE 105 may be associated with a prioritization, such as a device prioritization or a communication prioritization (e.g., a QoS or a message priority).

RAN 110 may support, for example, a cellular radio access technology (RAT). RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 105. RAN 110 may transfer traffic between UE 105 (e.g., using a cellular RAT), one or more base stations (e.g., using a wireless interface or a backhaul interface, such as a wired backhaul interface), and/or core network 115. RAN 110 may provide one or more cells that cover geographic areas.

In some implementations, RAN 110 may perform scheduling and/or resource management for UE 105 covered by RAN 110 (e.g., UE 105 covered by a cell provided by RAN 110). In some implementations, RAN 110 may be controlled or coordinated by a network controller, which may perform load balancing, network-level configuration, and/or other operations. The network controller may communicate with RAN 110 via a wireless or wireline backhaul. In some implementations, RAN 110 may include a network controller, a self-organizing network (SON) module or component, or a similar module or component. In other words, RAN 110 may perform network control, scheduling, and/or network management functions (e.g., for uplink, downlink, and/or sidelink communications of UE 105 covered by RAN 110).

In some implementations, core network 115 may include an example functional architecture in which systems and/or methods described herein may be implemented. For example, core network 115 may include an example architecture of a fifth generation (5G) next generation (NG) core network included in a 5G wireless telecommunications system. While the example architecture of core network 115 shown in FIG. 2 may be an example of a service-based architecture, in some implementations, core network 115 may be implemented as a reference-point architecture and/or a 4G core network, among other examples.

As shown in FIG. 2, core network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, and/or a UPF 120. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 205 includes one or more devices that select network slice instances for UE 105. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating UE 105 in the wireless telecommunications system.

UDM 220 includes one or more devices that store user data and profiles in the wireless telecommunications system. UDM 220 may be used for fixed access and/or mobile access in core network 115.

PCF 225 includes one or more devices that provide a policy framework that incorporates network slicing, roaming, packet processing, and/or mobility management, among other examples.

AF 230 includes one or more devices that support application influence on traffic routing, access to NEF 210, and/or policy control, among other examples.

AMF 235 includes one or more devices that act as a termination point for non-access stratum (NAS) signaling and/or mobility management, among other examples.

SMF 240 includes one or more devices that support the establishment, modification, and release of communication sessions in the wireless telecommunications system. For example, SMF 240 may configure traffic steering policies at UPF 120 and/or may enforce user equipment Internet Protocol (IP) address allocation and policies, among other examples.

UPF 120 includes one or more devices that serve as an anchor point for intraRAT and/or interRAT mobility. UPF 120 may apply rules to packets, such as rules pertaining to packet routing, traffic reporting, and/or handling user plane QoS, among other examples. In some implementations, UPF 120 may perform a preemption procedure, as described herein. In another network configuration, such as a 4G network, a 4G packet gateway (PGW) may perform a preemption procedure described herein in terms of UPF 120.

Message bus 250 represents a communication structure for communication among the functional elements. In other words, message bus 250 may permit communication between two or more functional elements.

Data network 255 includes one or more wired and/or wireless data networks. For example, data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
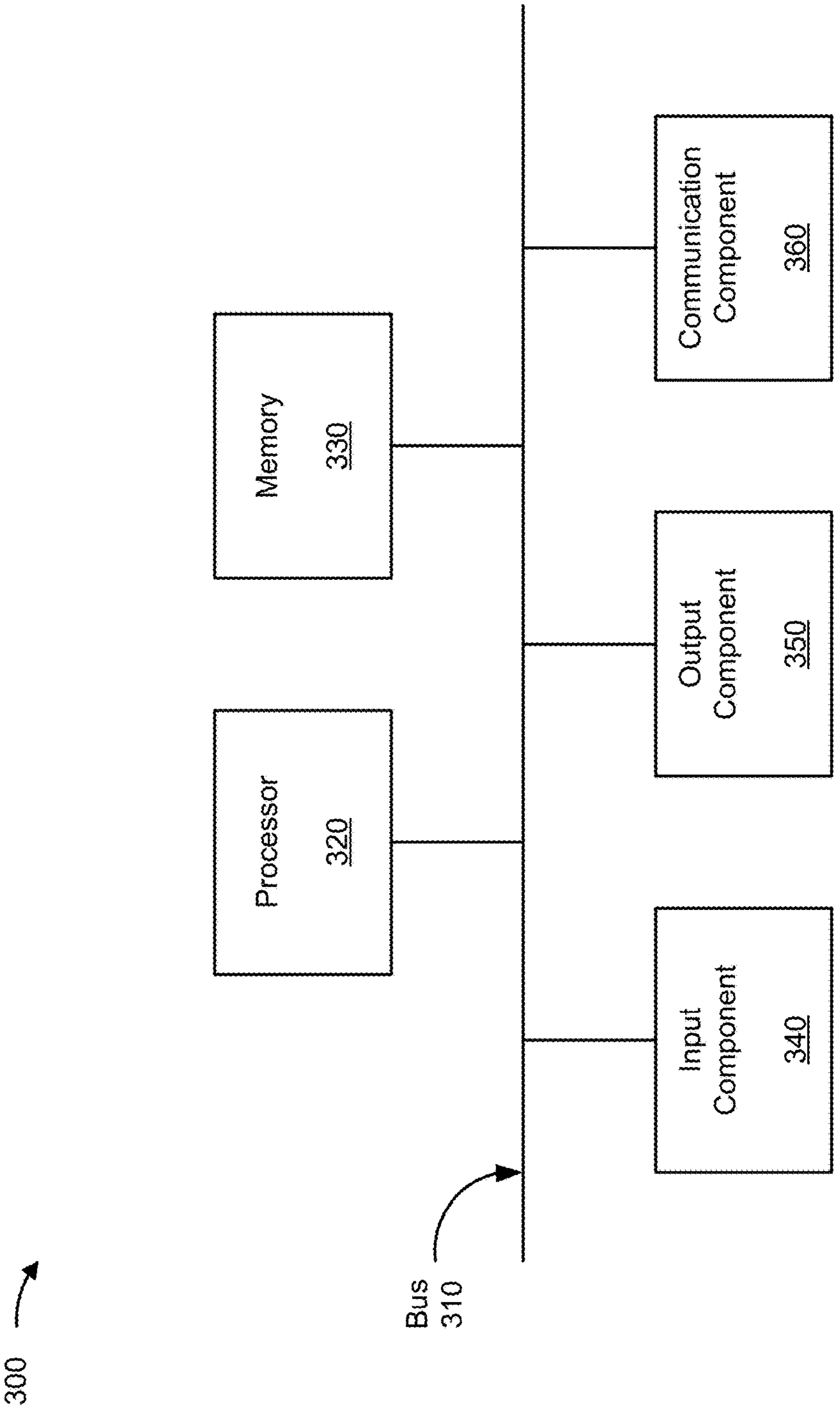
FIG. 3 is a diagram of example components of a device associated with network resource preemption.

FIG. 3 is a diagram of example components of a device 300 associated with network resource preemption. The device 300 may correspond to the UE 105, the RAN 110, and/or the devices and/or functions of the core network 115. In some implementations, the UE 105, the RAN 110, and/or the devices and/or functions of the core network 115 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
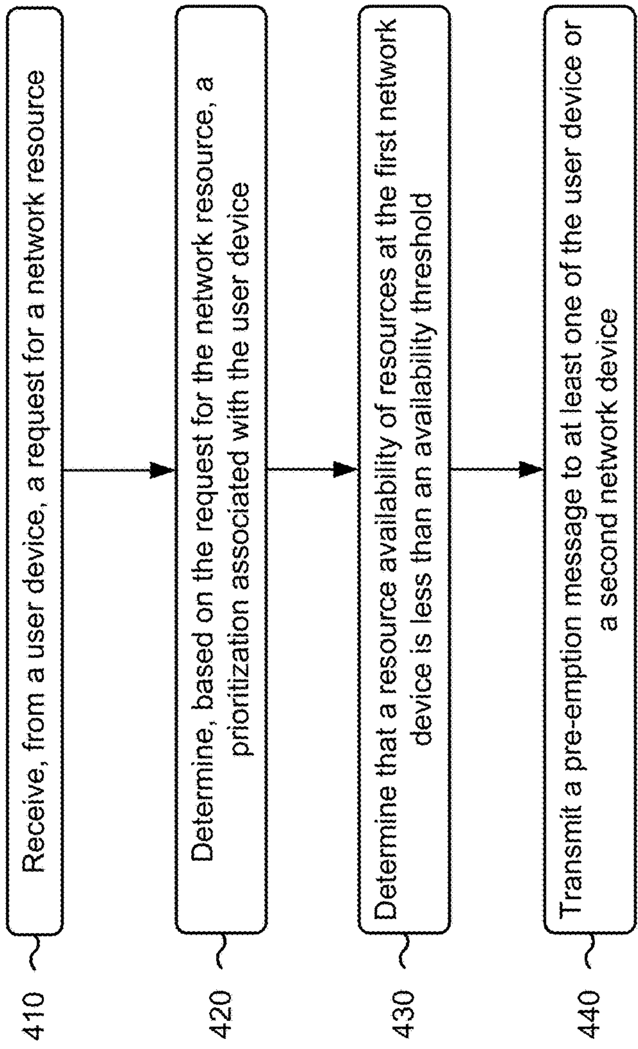
FIG. 4 is a flowchart of an example process associated with network resource preemption.

FIG. 4 is a flowchart of an example process 400 associated with network resource preemption. In some implementations, one or more process blocks of FIG. 4 may be performed by a first network device (e.g., the UPF 120, a 4G packet gateway, or another network device). In some implementations, one or more process blocks of FIG. 4 may be performed by another device or a group of devices separate from or including the first network device, such as a UE (e.g., the UE 105), a RAN (e.g., the RAN 110), and/or a core network device (e.g., a device or function of the core network 115). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving, from a UE, a request for a network resource (block 410). For example, the first network device may receive, from a UE, a request for a network resource, as described above. As an example, the first network device may receive a request to establish or modify a connection for a QoS flow.

As further shown in FIG. 4, process 400 may include determining, based on the request for the network resource, a prioritization associated with the UE (block 420). For example, the first network device may determine, based on the request for the network resource, a prioritization associated with the UE, as described above. In some implementations, the prioritization relates to a QoS attribute of the UE or a message priority of a message associated with the request for the network resource. In some implementations, determining the prioritization includes receiving information identifying an SBI message priority from the second network device. In some implementations, determining the prioritization includes receiving information identifying the QoS attribute from the second network device. In some implementations, the QoS attribute is an ARP parameter.

As further shown in FIG. 4, process 400 may include determining that a resource availability of resources at the first network device is less than an availability threshold (block 430). For example, the first network device may determine that a resource availability of resources at the first network device is less than an availability threshold, as described above. In some implementations, process 400 includes receiving information associated with a resource availability parameter relating to the resource availability of resources. In some implementations, the resource availability parameter includes information identifying at least one of a service type, a user type, a subscription type, or a priority level. In some implementations, determining that the resource availability of resources at the first network device is less than the availability threshold includes determining the availability threshold based on the resource availability parameter, determining the resource availability, and evaluating the resource availability with respect to the availability threshold based on determining the availability threshold and determining the resource availability.

As further shown in FIG. 4, process 400 may include transmitting a preemption message to at least one of the UE or a second network device (block 440). For example, the first network device may transmit a preemption message to at least one of the UE or a second network device, as described above. In some implementations, the preemption message indicates an interruption to one or more network resources associated with the UE or one or more other UEs associated with the second network device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a first network device and from a user equipment (UE), a request for a network resource;

determining, by the first network device and based on the request for the network resource, a prioritization associated with the UE, wherein the prioritization relates to a quality of service (QoS) attribute of the UE or a message priority of a message associated with the request for the network resource;

determining, by the first network device, that a resource availability of resources at the first network device is less than an availability threshold, wherein determining that the resource availability of resources at the first network device is less than the availability threshold comprises:

determining the availability threshold based on a resource availability parameter;

determining the resource availability; and evaluating the resource availability with respect to the availability threshold based on determining the availability threshold and determining the resource availability; and transmitting, by the first network device, a preemption message to at least one of the UE or a second network device, wherein the preemption message indicates an interruption to one or more network resources associated with the UE or one or more other UEs associated with the second network device.

2. The method of claim 1, wherein the first network device is a 5G user plane function (UPF) or a 4G packet gateway (PGW).

3. The method of claim 1, wherein determining the prioritization comprises:

receiving information identifying a service-based interface (SBI) message priority from the second network device.

4. The method of claim 1, wherein determining the prioritization comprises:

receiving information identifying the QoS attribute from the second network device.

5. The method of claim 4, wherein the QoS attribute is an allocation retention priority (ARP) or a 5G QoS identifier (5QI).

6. The method of claim 1, wherein the second network device is a session management function (SMF) or a policy control function (PCF).

7. The method of claim 1, further comprising:

receiving information associated with the resource availability parameter relating to the resource availability of resources, wherein the resource availability parameter includes information identifying at least one of:

a service type, a user type, a subscription type, or a priority level.

8. The method of claim 1, wherein the preemption message causes a connection to be removed, torn down, or altered.

9. A network device, comprising:

one or more processors configured to:

receive, from a user equipment (UE), a request for a network resource;

identify, based on the request for the network resource, a prioritization associated with the UE, wherein the prioritization relates to a quality of service (QoS) attribute of the UE or a message priority of a message associated with the request for the network resource;

identify a resource availability of resources at the network device;

evaluate the resource availability of resources at the network device with respect to the prioritization associated with the UE and a configured threshold for resource allocation;

identify, based on evaluating the resource availability of resources, one or more lower priority allocations of one or more resources at another network device; and transmit a preemption message to the other network device to interrupt the one or more lower priority allocations of the one or more resources.

10. The network device of claim 9, wherein the one or more processors are further configured to:

transmit, based on transmitting the preemption message, a resource allocation message to re-allocate the one or more resources to the UE.

11. The network device of claim 9, wherein the request for the network resource is a request for a protocol data unit (PDU) session establishment.

12. The network device of claim 9, wherein the request for the network resource is a request for a packet data network (PDN) session establishment.

13. The network device of claim 9, wherein the one or more processors, when identifying the prioritization, are configured to:

perform a deep packet inspection procedure to determine the QoS attribute.

14. The network device of claim 9, wherein the other network device is a user plane function (UPF) or a packet gateway (PGW).

15. A non-transitory computer-readable medium storing a set of instructions, the set of instructions comprising:

one or more instructions that, when executed by one or more processors of a network device, cause the network device to:

receive, from a user equipment (UE), a request for a network resource;

determine, based on the request for the network resource, a quality of service (QoS) parameter associated with the request for the network resource;

determine that a resource availability of resources at the network device is less than an availability threshold, wherein the one or more instructions, that cause the network device to determine that the resource availability is less than the availability threshold, cause the network device to:

determine the availability threshold based on a resource availability parameter;

determine the resource availability; and evaluate the resource availability with respect to the availability threshold based on determining the availability threshold and determining the resource availability;

identify one or more lower QoS parameter resource allocations based on determining the resource availability; and transmit a preemption message to re-allocate one or more resources from the one or more lower QoS parameter resource allocations to the request for the network resource.

16. The non-transitory computer-readable medium of claim 15, wherein the one or more instructions, that cause the network device to determine the QoS parameter, further cause the network device to:

receive information identifying a service-based interface (SBI) message priority.

17. The non-transitory computer-readable medium of claim 15, wherein the QoS parameter is an allocation retention priority (ARP) or a 5G QoS identifier (5QI).

18. The non-transitory computer-readable medium of claim 15, wherein the one or more instructions, that cause the network device to transmit the preemption message, further cause the network device to:

receive, based on transmitting the preemption message, an indication that one or more resources are available; and transmit a resource allocation message identifying a resource allocation of the one or more resources based on receiving the indication that the one or more resources are available.

19. The non-transitory computer-readable medium of claim 15, wherein the one or more instructions further cause the network device to:

receive information associated with the resource availability parameter relating to the resource availability of resources, wherein the resource availability parameter includes information identifying at least one of:

a service type, a user type, a subscription type, or a priority level.

20. The non-transitory computer-readable medium of claim 15, wherein the network device is a 5G user plane function (UPF) or a 4G packet gateway (PGW).

* * * * *